United States Patent Office 3,123,880
Patented Mar. 10, 1964

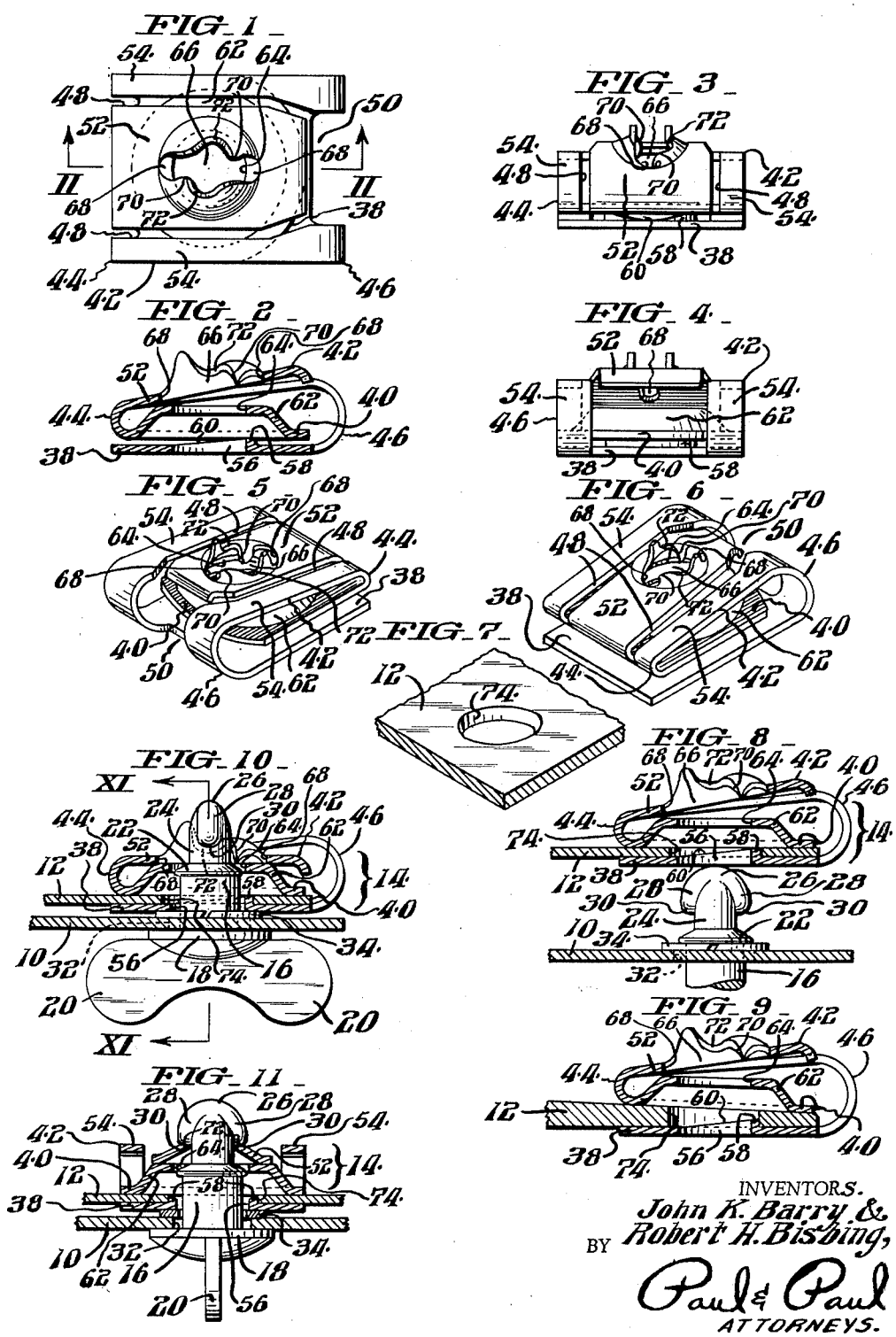

3,123,880
CLIP-ON RECEPTACLE OR SOCKET MEMBER FOR ONE-QUARTER TURN STUD
John K. Barry, Springfield, and Robert H. Bishing, Upper Darby, Pa., assignors to South Chester Corporation, Lester, Pa., a corporation of Delaware
Filed Sept. 21, 1961, Ser. No. 139,794
4 Claims. (Cl. 24—221)

This invention relates generally to fasteners and particularly to improvements in separable or rotary fasteners which are adapted to be easily and quickly actuated to secure or release the parts of an assembly wherein speed in fastening or unfastening of the assembly is necessary or desirable.

The invention has particular, but not sole, application and use in the provision of separable assemblies wherein a panel or plate-like part is releasably secured over a supporting part, as, for example, in the manner of a cover for a box or other container, or as a similar cover or closure for a panel opening or the like.

Separable fasteners of this character comprise a rotary stud equipped with lateral lugs and adapted by a quarter turn to be engaged with or disengaged from the spring arm of a cooperating clip-on type socket member. When the stud is turned in fastening direction, its lugs move over cam surfaces provided on the spring arm, and the clamping effort thereby induced tensions the stud, which is shifted axially for drawing the panel to the supporting member. Known arrangements of rotary fasteners have not proved to be entirely satisfactory because if additional tension is applied to the stud, after it has been turned, the spring arm, normally arched tends to yield and flatten out. Thus the load which may be applied to the fastener is unduly limited. Accordingly, an object of the invention is to provide such a rotary fastener with a socket member that is capable of withstanding materially greater loads applied by tensioning the stud.

Known arrangements of rotary fasteners have not proved to be entirely satisfactory for another reason. The clamping effort developed when the stud is turned varies with the thickness of the supporting member to which the socket member is attached. If a predetermined clamping effort is developed by a certain rotary fastener in a given environment, the same effort cannot be developed by the fastener if the thickness of the supporting member to which the socket member is attached is changed. Accordingly, another object of the invention is to provide a rotary fastener with a socket member which may be attached to supporting members of various thicknesses, and which, when actuated by the rotary stud, exerts a predetermined clamping effort irrespective of the thickness of the supporting member.

Other objects of the invention will become apparent when the following description is read with reference to the accompanying drawing, in which:

FIG. 1 is a view looking at the back of the socket member of a rotary fastener constructed in accordance with the invention;

FIG. 2 is a section on line II—II in FIG. 1;

FIGS. 3 and 4 are opposite end views of the socket member;

FIGS. 5 and 6 are perspective views of the socket member;

FIG. 7 is a perspective view of a portion of the supporting member apertured for receiving the socket member;

FIG. 8 is a horizontal section through the assembled panel and stud detached from the assembled supporting and socket members;

FIG. 9 is a section through the socket member attached to a supporting member in the form of the flange of an I-beam.

FIG. 10 is a horizontal section similar to FIG. 8, but the panel is shown attached to the supporting member; and FIG. 11 is a section on line XI—XI in FIG. 10.

Referring particularly to FIGS. 10 and 11, an upright panel 10 is fastened to an upright supporting part 12 by a fastener, generally designated 14, constructed in accordance with the invention. The supporting member may be, for example, the marginal area of an access opening in a casing or other fixed supporting member. Both the panel 10 and the supporting member 12 may be made of metal, wood, plastic, or other suitable material. Preferably the panel 10 and supporting member 12 are sheet metal stampings. As many of the fasteners 14 are arranged about the periphery of the panel 10 as may be required to secure the same in position.

The rotary stud is provided with a cylindrical main body part 16, a head 18 which, in this instance, is provided with wings 20, a radially outwardly extending flange 22, and a reduced diameter portion 24 terminating in an enlargement 26, which provides two diametrically opposite protuberances 28, each of which has a rounded shoulder 30. The body of the stud extends freely through an opening 32 in the panel 10 and is secured against displacement therefrom by a split washer 34 embracing the main body part 16 of the stud.

The socket member is fashioned from spring metal strip stock. The opposite end sections of the strip, respectively designated 38 and 40, are turned over an intermediate section 42 of the strip, the end section 40 being connected to the intermediate section 42 by a transversely extending bend 44, and the end section 38 being connected to the intermediate section 42 by a comparatively large radius transversely extending bend 46. The strip is provided with an opening comprising a pair of laterally spaced longitudinally extending narrow slots 48 communicating with a comparatively wide transversely extending slot 50, which opening forms in the intermediate section 42 a spring arm 52 extending directly from the end section 40 freely toward the large radius bend 46 and comparatively narrow opposite side portions 54 each connecting the end section 40 directly to the end section 38.

The end section 38 is provided with an opening 56 having a raised rim in the form of a detent 58. The top of the detent 58 is inclined to provide a cam surface 60.

An area of the end section 40 overlying the opening 56 is offset from the plane of the end section 40 toward the intermediate section 42 to afford a flat dished formation 62 centrally apertured, as at 64.

An area of the spring arm 52 overlying the formation 62 is provided with a stud passage 66 having a pair of diametrically opposite lateral slots 68. The portions of the arm 52 adjoining the stud passage 66 are turned from the plane of the arm 52 as required to form oppositely extending spiral-like cam surfaces 70 each rising gradually from adjacent one lateral slot 68 toward the other lateral slot 68. Each cam surface 70 is provided substantially at its highest point with a radial groove or notch 72 adapted to receive and retain a lug 28 of the rotary stud 14.

The socket member is forced over the edge of the supporting member 12 and positioned as shown so that the detent 58 engages in an opening 74 formed in the supporting member 12. The opening 56 in the end section 38, the opening 64 in the formation 62, and the opening 66 in the arm 52 are disposed in registry for receiving the rotary stud. It should be noted that regardless of the thickness of the supporting member 12 (within a predetermined range of thicknesses) when the end sections 38 and 40 respectively engage the oppositely facing surfaces of the supporting member 12, each is disposed over, and flatwise in contact with, a large section of the opposed surface area of the supporting member 12. The forces exerted by the end sections 38 and 40 upon the supporting member 12 are normal thereto, equal and opposite in direction and substantially concentric relative to the opening in the supporting member 12. Thus detent 58 engages in opening 74 in the same manner, and openings 56, 64 and 66 are effectively aligned, irrespective of the thickness of the supporting member 12.

In the use of a fastener constructed in accordance with the invention, the panel 10, fitted with the desired number of rotary studs, is positioned with each stud in registry with the opening 56 in a socket member mounted upon the supporting member, as suggested in FIG. 8. Then the panel 10 is moved inwardly toward the supporting member for projection of each stud freely through the apertures 56, 64, and 66 in the associated socket member. At this point in the operation, the rounded shoulders 30 of the studs are positioned for engagement with the lowermost portions of the cam surfaces 70. Then each stud is given a quarter turn in fastening direction, whereupon its shoulders 30 move upwardly on cam surfaces 70. As the stud is turned, the spring arm 52 is forced downwardly, preferably to a position wherein it just clears the dished formation 62. As the stud approaches the end of the quarter turn, its shoulders 30 lodge in the notches 72.

If the fastener is loaded to further tension the stud, as by pulling on the head thereof, the spring arm 52 is forced to seat hard on the dished formation 62, which inherently has the capacity to withstand a great load without deforming. Thus the socket member is characterized by a high bearing capacity.

The base of the spring arm 52, at the small radius bend 44, must bend if the angular spacing between the spring arm 52 and the dished formation 62 is to change. However, such bending cannot occur because the two side portions 54 are separated from the spring arm 52 by the narrow slots 48, which extend throughout the region of possible bending. Thus the two side portions 54 bend at their radii. Accordingly, referring particularly to FIGS. 2, 8, and 9, it will be observed that regardless of the thickness of the supporting member 12, the angular spacing between spring arm 52 and dished formation 62 initially is the same, in consequence of which, when the stud is actuated, the clamping effort induced is independent of the thickness of the supporting member.

It will be understood, of course, that the present invention, as described and shown, is susceptible to various changes and modifications which may be made without any departure from the general principles or real spirit of the invention. Accordingly, it is intended to claim the present invention broadly, as well as specifically, as indicated in the appended claims.

Having thus described our invention, we claim as follows:

1. In a device for quick detachably fastening together a pair of mutually overlying plate members, a socket member consisting of a single flat strip of spring metal having first and second opposite end sections and an intermediate section, said first end section being turned with a small radius bend back over said intermediate section, said second end section being turned with a larger radius bend back over said first end section and disposed in predetermined spaced relation to said first end section for receiving between said end sections the marginal portion of an inner one of said plate members, and said intermediate section including an arm extending freely from the small bend end toward the larger bend end thereof, and a stud having a head on one end thereof for engaging with an outer one of said plate members, a main body part adapted for extending freely through registering openings in said plate members, opposite end sections and arm, and lug means on the opposite end of said stud, said stud being operable for turning said lug means thereby to effectively engage said arm and draw said plate members, opposite end sections and arm together and operatively seat each firmly upon an underlying one thereof against the inherent spring of said socket member.

2. In a device for quick detachably fastening together a pair of mutually overlying plate members, a socket member consisting of a single flat strip of spring metal having first and second opposite end sections and an intermediate section, said first end section being turned with a small radius bend back over said intermediate section, said second end section being turned with a larger radius bend back over said first end section and disposed in predetermined spaced relation to said first end section for receiving between said end sections the marginal portion of an inner one of said plate members, said intermediate section including an arm extending freely from the small bend end toward the larger bend end thereof and said first end section including a dished area, and a stud having a head on one end thereof for engaging with an outer one of said plate members, a main body part adapted for extending freely through registering openings in said plate members, second end section, dished area and arm, and lug means on the opposite end of said stud, said stud being operable for turning said lug means thereby to effectively engage said arm and draw thereby drawing said plate members, opposite end sections and arm together and operatively seat each firmly upon an underlying one thereof against the inherent spring of said socket member, said arm being seated directly upon said dished area.

3. In a device for quick detachably fastening together a pair of mutually overlying plate members, a socket member consisting of a single flat strip of spring metal having first and second opposite end sections and an intermediate section, said first end section being turned with a small radius bend back over said intermediate section, said second end section being turned with a larger radius bend back over said first end section and disposed in predetermined spaced relation to said first end section for receiving between said end sections the marginal portion of an inner one of said plate members, said intermediate section including an arm extending freely from the small bend end toward the larger bend end thereof, and said first end section including a dished area with a flat bottom offset from the plane of said first end section toward said arm, and a stud having a head on one end thereof for engaging with an outer one of said plate members, a main body part adapted for extending freely through registering openings in said plate members, opposite end sections and arm, and lug means on the opposite end of said stud, said stud being operable for turning said lug means thereby to effectively engage said arm and draw said plate members, opposite end sections and arm together and operatively seat each firmly upon an underlying one thereof against the inherent spring of said socket member.

4. In a device for quick detachably fastening together a pair of mutually overlying plate members, a socket member consisting of a single flat strip of spring metal having first and second opposite end sections and an intermediate section, said first end section being turned with a small radius bend back over said intermediate section, said second end section being turned with a larger radius bend back over said first end section and disposed in predetermined spaced relation to said first end section for receiving between said end sections the marginal portion of an inner one of said plate members, said intermediate section including an arm extending freely from the small bend end toward the larger bend end thereof, said first end section including a dished area with a flat bottom offset from the plane of said first end section toward said arm, said opposite end sections and the bottom of said dished area being disposed in substantially parallel relation, and said arm being angularly spaced from said flat dished area, and a stud having a head on one end thereof for engaging with an outer one of said plate members, a main body part adapted for extending freely through registering openings in said plate members, opposite end sections and arm, and lug means on the opposite end of said stud, said stud being operable for turning said lug means thereby to effectively engage said arm and draw said plate members, opposite end sections and arm together and operatively seat each firmly upon an underlying one thereof against the inherent spring of said socket member.

References Cited in the file of this patent

UNITED STATES PATENTS

| | | |
|---|---|---|
| 2,378,258 | Tinnerman | June 12, 1945 |
| 2,408,153 | Steans et al. | Sept. 24, 1946 |
| 2,593,064 | Silberman | Apr. 15, 1952 |
| 2,798,277 | Flora | July 9, 1957 |

UNITED STATES PATENT OFFICE
CERTIFICATE OF CORRECTION

Patent No. 3,123,880

March 10, 1964

John K. Barry et al.

It is hereby certified that error appears in the above numbered patent requiring correction and that the said Letters Patent should read as corrected below.

Column 4, line 28, strike out "thereby drawing".

Signed and sealed this 15th day of September 1964.

(SEAL)
Attest:

ERNEST W. SWIDER
Attesting Officer

EDWARD J. BRENNER
Commissioner of Patents